US008159763B2

(12) United States Patent
Ashizawa

(10) Patent No.: US 8,159,763 B2
(45) Date of Patent: Apr. 17, 2012

(54) VIBRATING ELEMENT, VIBRATION ACTUATOR, LENS BARREL, CAMERA SYSTEM AND METHOD FOR DRIVING VIBRATION ACTUATOR

(75) Inventor: Takatoshi Ashizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/293,525

(22) PCT Filed: Mar. 20, 2007

(86) PCT No.: PCT/JP2007/055642
§ 371 (c)(1),
(2), (4) Date: Aug. 3, 2009

(87) PCT Pub. No.: WO2007/108466
PCT Pub. Date: Sep. 27, 2007

(65) Prior Publication Data
US 2009/0303622 A1 Dec. 10, 2009

(30) Foreign Application Priority Data
Mar. 22, 2006 (JP) ................. 2006-078974

(51) Int. Cl.
*G02B 7/02* (2006.01)
*H02N 2/00* (2006.01)
(52) U.S. Cl. ................... 359/824; 310/323.06
(58) Field of Classification Search .......... 359/694–704, 359/811–824; 310/323.02–323.16, 317, 310/328
See application file for complete search history.

(56) References Cited

U.S. PATENT DOCUMENTS

| 4,421,381 | A | * | 12/1983 | Ueda et al. ................. 359/214.1 |
| 4,868,446 | A | | 9/1989 | Kumada |
| 5,760,527 | A | * | 6/1998 | Ashizawa ..................... 310/317 |
| 6,252,332 | B1 | * | 6/2001 | Takagi et al. ............ 310/323.02 |
| 6,297,578 | B1 | * | 10/2001 | Takeuchi et al. ............. 310/330 |
| 7,365,914 | B2 | * | 4/2008 | Sasaki et al. .................. 359/696 |
| 7,457,055 | B2 | * | 11/2008 | Kawasaki et al. ............. 359/798 |
| 7,535,661 | B2 | * | 5/2009 | Matsuki ....................... 359/811 |
| 7,732,980 | B2 | * | 6/2010 | Morioke ................. 310/323.06 |

FOREIGN PATENT DOCUMENTS

| JP | 63-242182 | | 10/1988 |
| JP | 07-002229 | B2 | 2/1990 |
| JP | 10-272420 | | 10/1998 |
| JP | 2002-357760 | | 12/2002 |

OTHER PUBLICATIONS

International Search Report for corresponding International Application No. PCT/JP2007/055642, Jun. 12, 2007.

\* cited by examiner

*Primary Examiner* — Mohammed Hasan
(74) *Attorney, Agent, or Firm* — Ditthavong Mori & Steiner, P.C.

(57) ABSTRACT

To provide a vibrating element which can be driven by a low voltage, a vibration actuator, a lens barrel, a camera system and a method for driving a vibration actuator. A vibrating element (10) is provided with an elastically deformable tube-like member (11) having a hollow section (15); and an input sections (13 (13-1 to 13-4)), which are arranged on the outer surface of the tube-like member (11) and/or the inner surface of the tube-like member on the side of the hollow section (15), are divided into n (n is an integer of 3 or more) in the circumference direction of the tube-like member (11), and permit the tube-like member (11) to input a physical signal.

20 Claims, 9 Drawing Sheets

FIG. 4A
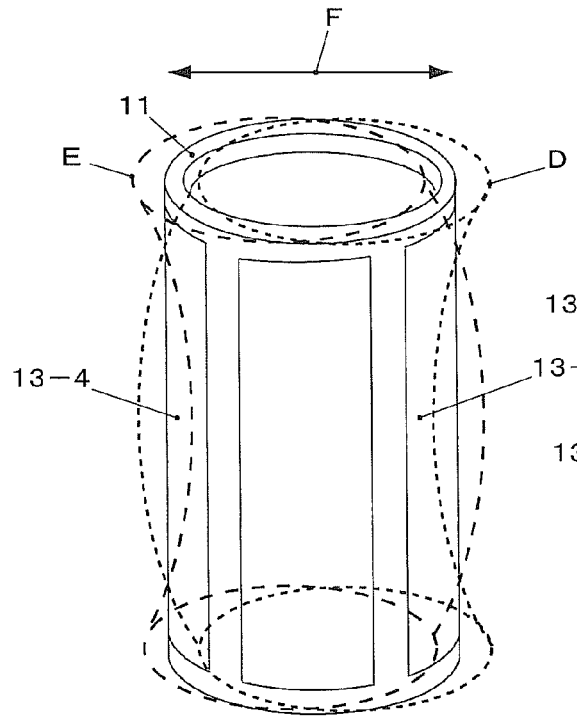
FIG. 4B
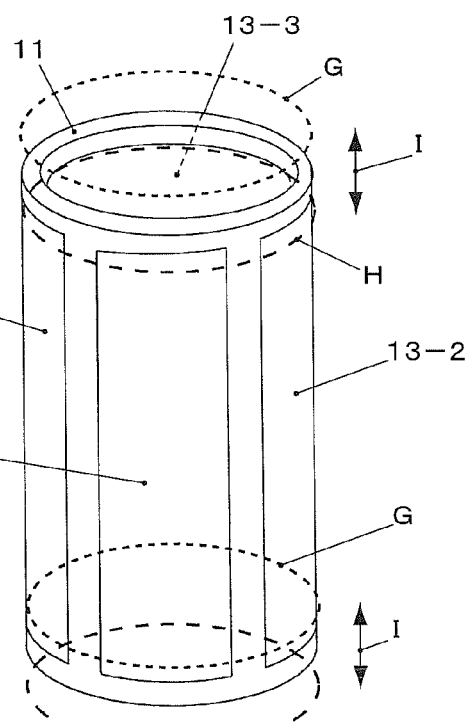
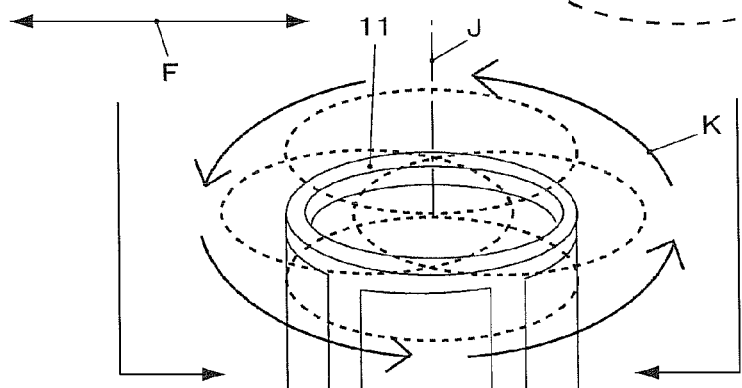
FIG. 4C
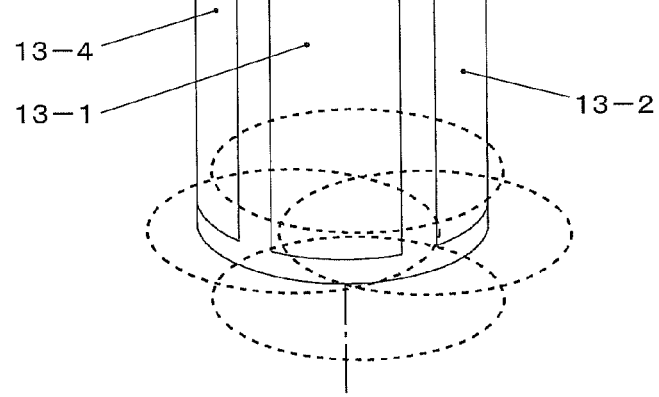

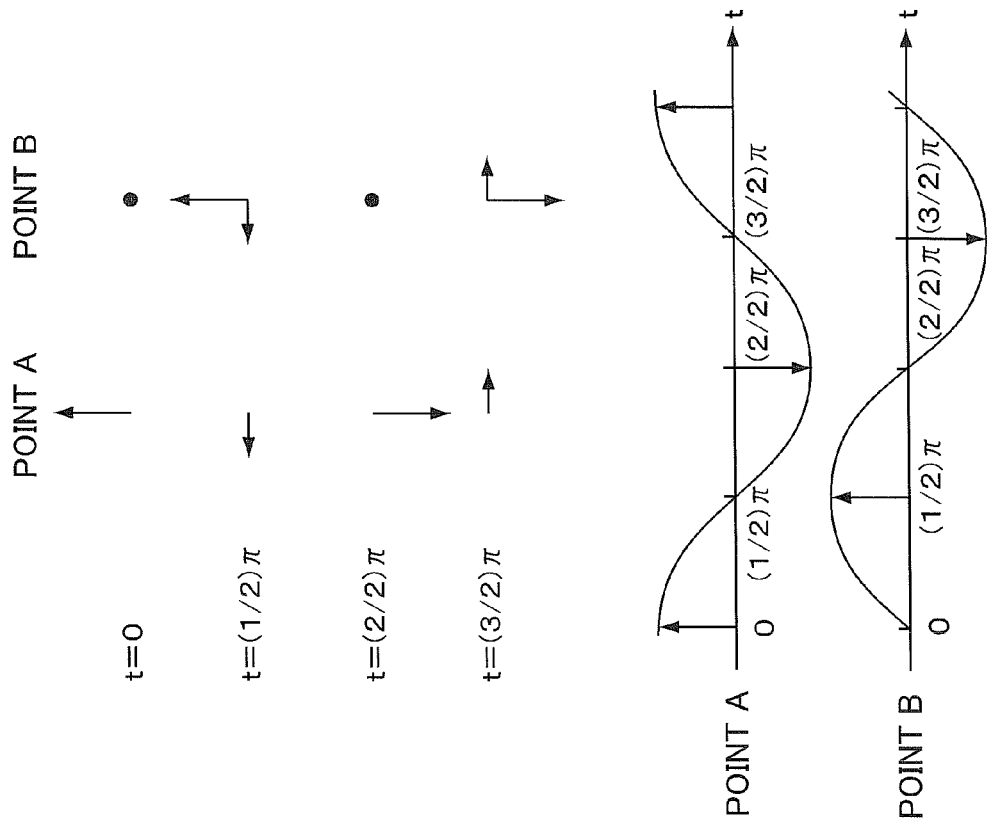
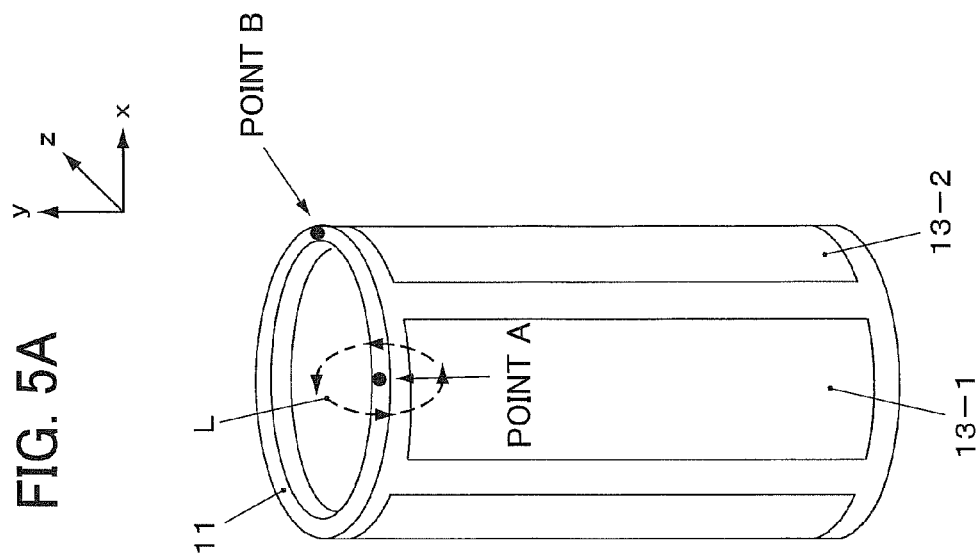

VIBRATING ELEMENT, VIBRATION ACTUATOR, LENS BARREL, CAMERA SYSTEM AND METHOD FOR DRIVING VIBRATION ACTUATOR

TECHNICAL FIELD

The invention relates to a vibrating element, a vibration actuator, a lens barrel, a camera system and a method for driving a vibration actuator.

BACKGROUND ART

Conventionally, vibrating wave motors generate a progressive vibrating wave on the drive surface of an elastic body by utilizing expansion and contraction of a piezoelectric body, and elliptic motion is induced on the drive surface by the progressive vibrating wave. A moving element is press-contacting the drive surface of the elastic body, and the moving element is friction driven by the elliptic motion.

On the other hand, a vibrating wave motor using vibrations other than progressive vibrating waves is also known (for example, Patent Document 1). In this type of vibrating wave motor, a cylindrically shaped vibrating element is made to undergo flexing vibrations, and the moving element press-contacting the end surfaces of the vibrating element is friction driven by the flexing vibrations.

Recently, there has been a trend to miniaturize vibrating wave motors and make them lighter by reducing their diameter to approximately one third to one fifth of that of conventional ones. In this miniaturization, a diameter of conventional vibrating wave motors using progressive vibrating waves becomes small and an absolute value of vibrating amplitude becomes small, hence the output performance might be lowered.

The vibrating wave motors generally use, as a vibration source, an electromechanical conversion element such as a piezoelectric element. The piezoelectric element induces a displacement due to expansion and contraction by voltage application, and the displacement per 1V voltage is extremely small, on the order of about several nm. In order to obtain a displacement capable of driving the moving element, a drive signal needs to have a voltage of at least about 80 to 100 Vp-p, and the voltage tends to become high.

Particularly in a vibrating element having the shape as described in the above Patent Document, the electrodes to which the voltage is applied are apart from each other, and the electrostatic capacity is small, thus requiring a higher voltage.

In general, vibrating wave motors use drive signals in a nonaudible vibrating wave range (not less than 20 kHz). Therefore, in order to raise the voltages of the driving signals in the vibrating wave range to a degree that the piezoelectric element can be vibrated, the circuit size might become large and the manufacturing cost might increase.

Patent Document 1: Japanese Examined Patent Publication No. H7-2229.

DISCLOSURE OF THE INVENTION

Problems to be Solved by the Invention

Accordingly, it is desirable to provide a low-voltage drivable vibrating element, a vibration actuator, a lens barrel, a camera system and a method for driving a vibration actuator.
Means for Solving the Problems The invention solves the above problem by the following means. In order to simplify an understanding of the invention, in the following description, the references used for the accompanying drawings illustrating embodiments are retained for similar parts merely by way of example and without limitation.

The invention of claim 1 is a vibrating element (10) including: an elastically deformable tube-like member (11) having a hollow section (15); and input sections (13) to input physical signals to the tube-like member (11), the input sections (13) being mounted on the outer surface of the tube-like member(11) and/or the inner surface of the hollow section (15) side, and being divided into n (n is an integer of 3 or more) in the circumferential direction of the tube-like member (11).

The invention of claim 2 is a vibrating element (10) according to claim 1, wherein the tube-like member (11) is one of an electromechanical conversion element and a member provided with an electromechanical conversion element.

The invention of claim 3 is a vibrating element (10) according to claim 2, wherein the electromechanical conversion element is polarized in one of the direction from the inside to the outside of the tube-like member (11) and the direction from the outside to the inside thereof.

The invention of claim 4 is a vibrating element (10) according to any one of claims 1 to 3, wherein the tube-like member (11) has a cylindrical shape.

The invention of claim 5 is a vibrating element (10) according to any one of claims 1 to 4, wherein the input sections (13) are input electrodes.

The invention of claim 6 is a vibrating element (10) according to any one of claims 1 to 5, wherein a pair of the input sections (13-1, 13-3, 13-2, 13-4) are arranged opposite each other around the center of the tube-like member.

The invention of claim 7 is a vibration actuator (100) comprising a vibrating element (10) according to any one of claims 1 to 6; and a relative moving member (20) in contact with the end surfaces of the vibrating element (10) and moved relative to the vibrating element (10) by vibration of the vibrating element (10).

The invention of claim 8 is a vibrating actuator (100) according claim 7, further provided input circuits (90) to input the physical signals having a 360-degree/n phase shift with respect to one another to the n-divided input sections (13-1, 13-2, 13-3, 13-4).

The invention of claim 9 is a vibrating actuator (100) according claim 8, wherein the input circuits (90) input the physical signals having a 360-degree/n phase shift to the input sections (13-1, 13-2, 13-3, 13-4) adjacent each other.

The invention of claim 10 is a vibrating actuator (100) according any one of claims 7 to 9, wherein the end surface of the tube-like member (11) in contact with the relative moving member (20) undergoes wobbling motion.

The invention of claim 11 is a vibrating actuator (100) according any one of claims 7 to 10, wherein the vibration mode of the tube-like member (11) is a secondary bending mode.

The invention of claim 12 is a vibrating actuator (100A) according any one of claims 7 to 11, further provided a support member (70) to support the tube-like member at nodes (M) of vibration generated in the tube-like member (11).

The invention of claim 13 is a vibrating actuator (100) according any one of claims 7 to 12, further provided a slide member (12) mounted on a contact end surface between the vibrating element (10) and the relative moving member (20).

The invention of claim 14 is a lens barrel (3) including a vibrating actuator (100) according any one of claims 7 to 13.

The invention of claim 15 is a camera system (1) including the vibration actuator (100) according to the claim 7 to 13.

The invention of claim 16 is a method for driving a vibration actuator, the vibration actuator including: a vibrating element (10) provided with an elastically deformable tube-like member (11) having a hollow section (15), and input sections (13) to input physical signals to the tube-like member (11), the input sections (13) being mounted on the outer surface of the tube-like member (11) and/or the inner surface of the hollow section (15) side and being divided into n (n is an integer of 3 or more) in the circumferential direction of the tube-like member (11); and a relative moving member (20) moved by the vibrating element (10). In this method, the vibration actuator (100) is driven by inputting physical signals having a 360-degree/n phase shift with respect to one another to the n-divided input sections (13-1, 13-2, 13-3, 13-4).

The invention of claim 17 is a method according claim 16, wherein the vibration actuator is driven by inputting the physical signals having a 360-degree/n phase shift with respect to one another to the input sections (13-1, 13-2, 13-3, 13-4) adjacent each other.

Alternatively, the components described along with the references may be modified suitably, and at least part of these may be replaced with other components.

Effects of the Invention

Thus, the invention is capable of providing the low-voltage drivable vibrating elements, the vibration actuators, lens barrels, camera systems and the methods for driving a vibration actuator.

BRIEF DESCRIPTION OF THE DRAWINGS

FIGS. 4A to 4C are diagrams explaining the driving principle of the vibrating element 10;

FIGS. 5A and 5B are diagrams explaining the elliptic motion of point A on the end surface of a piezoelectric body 11;

PREFERRED MODE FOR CARRYING OUT THE INVENTION

Embodiments of the invention will be described in detail below with reference to the accompanying drawings. In the following embodiments, vibrating wave motors are examples of a vibration actuator.

First Embodiment

Figure 1:
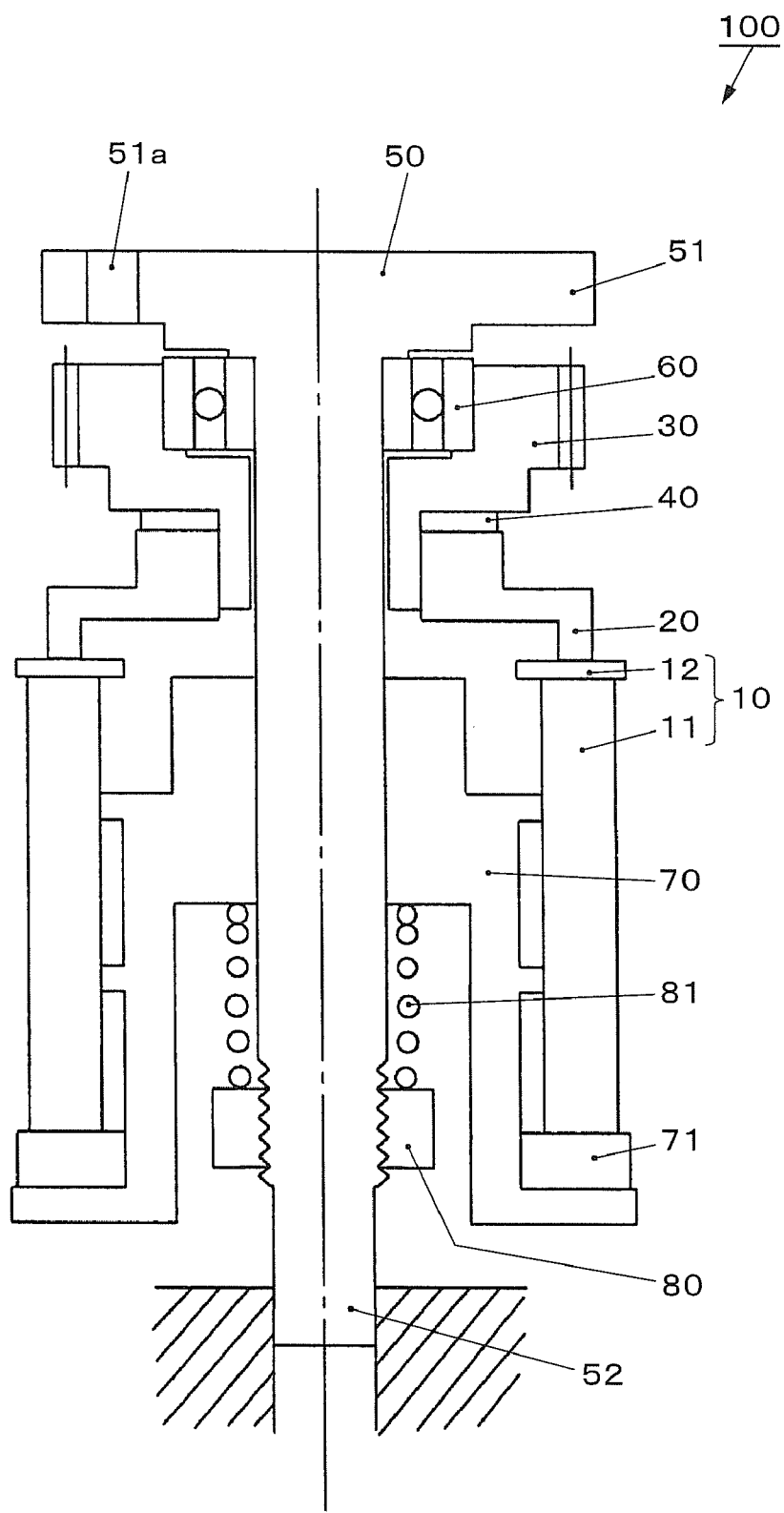
FIG. 1 is a diagram showing a vibrating wave motor according to a first embodiment.

FIG. 1 is a sectional view showing the vibrating wave motor of a first embodiment.

The vibrating wave motor 100 of the first embodiment is an ultrasonic wave motor using an ultrasonic vibration range, and is provided with a vibrating element 10, a moving element 20, an output gear 30, a rubber member 40, a fixed shaft 50, a bearing 60 and a vibrating element support member 70.

In the first embodiment, the vibrating element 10 is fixed and the moving element 20 is driven.

The vibrating element 10 has a piezoelectric body 11 and a slide plate 12.

The piezoelectric body 11 is an elastically deformable cylindrically shaped member to be described in detail later.

The slide plate 12 is a ring-shaped disc connected to a contact end surface with the moving element 20, and is formed of a metal material such as aluminum, brass, iron, stainless steel or the like. The slideway thereof is subjected to surface treatment, such as NiP, for the purpose of enhancing slidability.

The moving element 20 is a member rotatably driven by the vibration of the vibrating element 10, and formed of a light metal such as aluminum. The slideway thereof is subjected to surface treatment, such as alumite, for the purpose of improving wear resistance.

The output gear 30 is connected through a rubber member 40 to the moving element 20, and is rotated integrally with the moving element 20.

The rubber member 40 is interposed between the moving element 20 and the output gear 30, and has a function of preventing sliding in the rotational direction between the moving element 20 and the output gear 30 by rubber frictional force, and an vibration absorbing function for preventing the vibrations from the moving element 20 from propagating to the output gear 30. Examples of suitable materials of the rubber member 40 are butyl rubber, propylene rubber and silicone rubber.

The fixed shaft 50 is a member axially extending through the inner peripheries of the vibrating element 10 and the moving element 20. The fixed shaft 50 has a flange 51 and a shaft-like projection 52.

The flange 51 is mounted on the upper end of the fixed shaft 50 and is provided with a plurality of screw holes 5la (only one is shown in FIG. 1) so that the vibration wave motor 100 can be firmly secured to a device (not shown).

The shaft-like projection 52 is arranged at the lower end of the fixed shaft 50 and prevents the vibration of the fixed shaft 50 during motor rotation.

The bearing 60 is inserted into the fixed shaft 50 and then firmly secured thereto, and rotatably supports the output gear 30.

The vibrating element support member 70 radially and axially supports the piezoelectric body 11. For the axial support, a felt 71 is interposed between the vibrating element support member 70 and the piezoelectric body 11. The felt 71 is less liable to propagate the vibrations of the piezoelectric body 11 to the vibrating element support member 70, and its contact with the piezoelectric body 11 causes less damping of the vibrations. Alternatively, the felt 71 may be any unwoven fabric.

For the radial support, the vibrating element support member 70 is connected to part of the inner surface of the piezoelectric body 11. The vibrating element support member 70 is further engaged with the fixed shaft 50, and the slide plate 12 of the vibrating element 10 and the moving element 20 are press-contacting each other by fastening a pressure spring 81 with a pressure nut 80 mounted on the fixed shaft 50.

Next, the vibrating element of the first embodiment will be described.

Figure 2A:
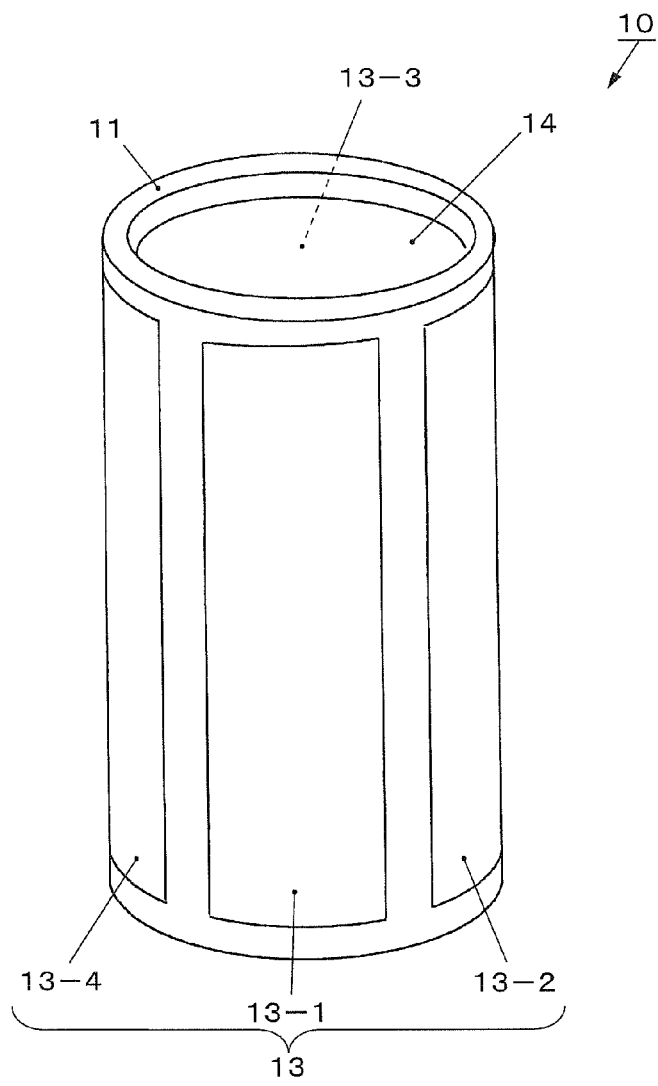
FIGS. 2A and 2B are diagrams showing a vibrating element of the first embodiment.
Figure 2B:
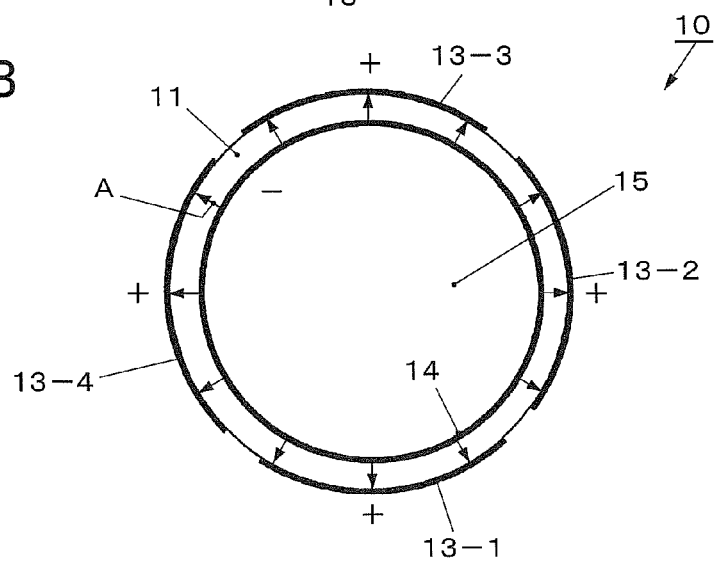

FIGS. 2A and 2B are diagrams showing the vibrating element of the first embodiment. FIG. 2A is an outer view of the vibrating element. FIG. 2B is a diagram when the vibrating element in FIG. 2A is viewed from above.

The vibrating element 10 of the first embodiment has the piezoelectric body 11, outer peripheral electrode patterns 13 and inner peripheral electrode pattern 14.

As described with reference to FIG. 1, the moving element plate 12 is connected to the end surfaces of the piezoelectric body 11, which is not shown in FIG. 2.

The piezoelectric body 11 is a cylindrically shaped member having a small thickness (preferably, approximately 0.1 to 0.5 mm), and constructed from an electromechanical conversion element such as a piezoelectric element and an electrostrictive element that converts electrical energy to mechanical energy. The piezoelectric body 11 longitudinally expands and contracts upon input of a drive signal such as alternating voltage as an example of a physical signal. Preferably, the diameter of the piezoelectric body 11 in FIG. 2B is 5 to 15 mm.

The piezoelectric body 11 has a hollow section 15. The outer peripheral electrode patterns 13 are arranged on the outer peripheral surface of the piezoelectric body 11 (namely, the surface not contacting the hollow section 15), and divided into four in the circumferential direction of the piezoelectric body 11 (in the direction along the circumference). The outer peripheral electrode patterns 13 are input electrodes to input drive signals to the piezoelectric body 11. The individual outer peripheral electrode patterns (a first electrode 13-1, a second electrode 13-2, a third electrode 13-3 and a fourth electrode 13-4) are rectangular electrode patterns. The center of each of these electrodes is arranged at a position shifted 90 degrees with respect to the circumferential center of the piezoelectric body 11. The first electrode 13-1 and the third electrode 13-3, and the second electrode 13-2 and the fourth electrode 13-4 are arranged opposite each other.

Although the first electrode 13-1, the second electrode 13-2, the third electrode 13-3 and the fourth electrode 13-4 are arranged at different positions, these electrodes have the same size and characteristics. The first electrode 13-1 and the third electrode 13-3, and the second electrode 13-2 and the fourth electrode 13-4 are symmetrically arranged with respect to the center line (the axial line) of the cylindrical shape of the piezoelectric body 11.

The inner peripheral electrode pattern 14 is a non-divided input electrode extending substantially along the entire inner peripheral surface (i.e. the surface in contact with the hollow section 15) of the piezoelectric body 11.

The piezoelectric body 11 is polarized in the same direction by using the outer peripheral electrode patterns 13 and the inner peripheral electrode pattern 14. FIG. 2B shows an example thereof. The piezoelectric body 11 is polarized in the direction from the inside to the outside of the thickness portion at the peripheral edge (the directions indicated by arrows A) by applying a voltage to the piezoelectric body 11, taking the inner peripheral side as being negative, and the outer peripheral side as being positive.

FIG. 3 and FIGS. 4A to 4C are diagrams explaining the driving principle of the vibrating element 10.

Figure 3:
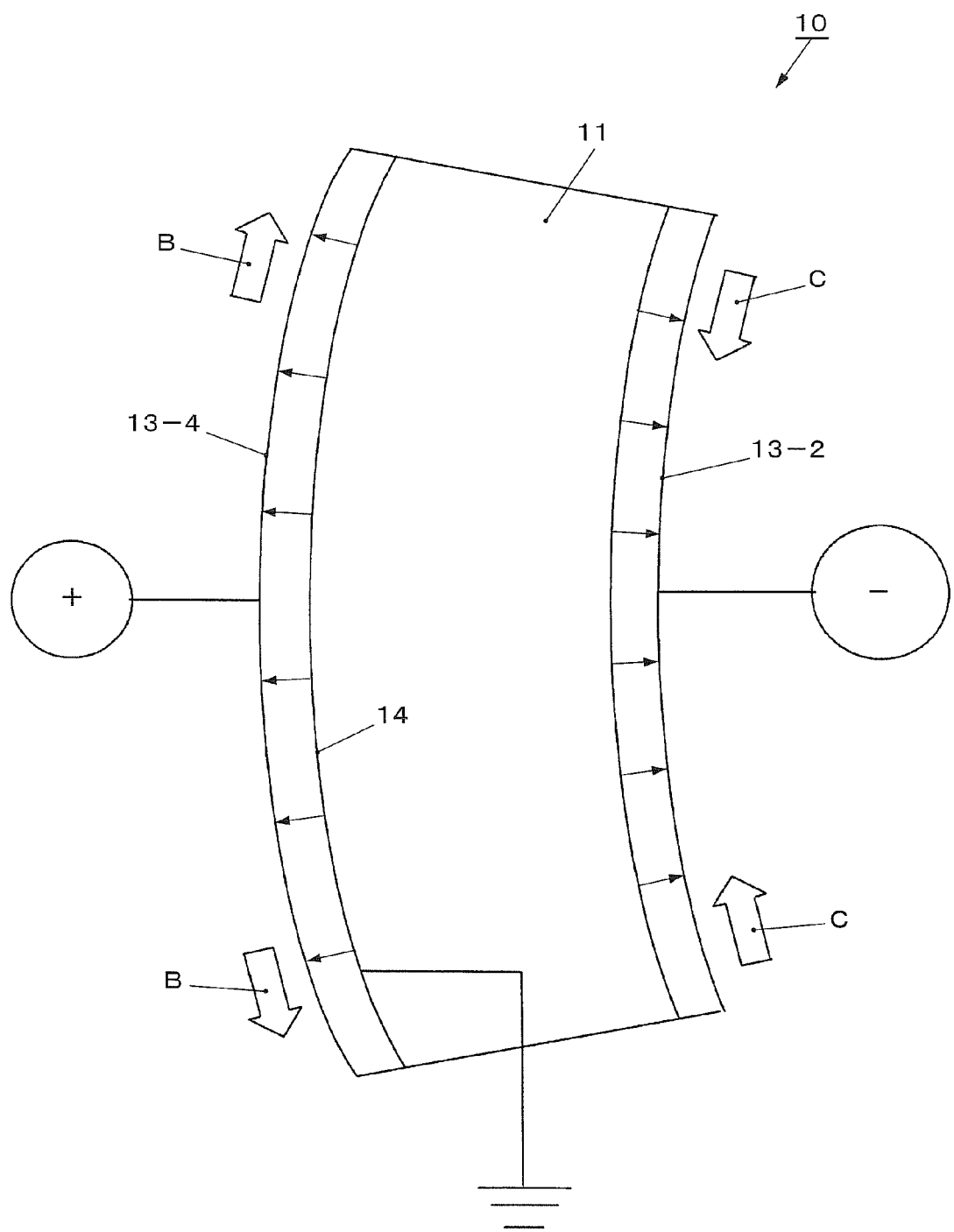
FIG. 3 is a diagram explaining the driving principle of the vibrating element 10.

FIG. 3 is a cross section wherein the vibrating element 10 in FIG. 2A is vertically cut, viewed from the first electrode 13-1. As shown in FIG. 3, when the inner peripheral electrode pattern 14 is grounded and applying a positive voltage and a negative voltage to the oppositely arranged fourth and second electrodes 13-4 and 13-2, respectively, the piezoelectric body 11 located on the fourth electrode 13-4 of the positive side expands axially (in the direction indicated by the arrows B), and the piezoelectric body 11 located on the second electrode 13-2 of the negative side contracts in the reverse direction of the axial direction indicated by the arrows B (in the direction indicated by the arrows C).

Owing to the expansion and contraction of the opposed side surfaces in opposite directions, a displacement of secondary bending mode with respect to the axial line is generated in the piezoelectric body 11.

The case where an alternating voltage is applied will be described below.

As shown in FIG. 4A, firstly, when a positive voltage is applied to the fourth electrode 13-4 and a negative voltage is applied to the second electrode 13-2, the piezoelectric body 11 located on the fourth electrode 13-4 of the positive side expands axially, and the piezoelectric body 11 located on the second electrode 13-2 of the negative side contracts axially. As a result, the piezoelectric body 11 is brought into the state indicated by the broken line D.

Conversely, when a negative voltage is applied to the fourth electrode 13-4 and a positive voltage is applied to the second electrode 13-2, the piezoelectric body 11 located on the fourth electrode 13-4 of the negative side contracts axially, and the piezoelectric body 11 located on the second electrode 13-2 of the positive side expands axially. As a result, the piezoelectric body 11 is brought into the state indicated by the broken line E.

In alternating voltage, a positive potential and a negative potential are outputted repetitively with the elapse of time. Therefore, when the alternating voltage is applied to the second electrode 13-2 and the fourth electrode 13-4 so as to have the opposite polarity to each other, a secondary bending mode vibration, which gives rise to displacements in a left and right direction (the direction indicated by the double-headed arrow F) in the drawing with respect to the axial line, is generated in the piezoelectric body 11.

On the other hand, the case where an alternating voltage is applied to the first electrode 13-1 and the third electrode 13-3 will be described below.

As shown in FIG. 4B, firstly, when a positive voltage is applied to the first electrode 13-1 and a negative voltage is applied to the third electrode 13-3, the piezoelectric body 11 located on the first electrode 13-1 of the positive side expands axially, and the piezoelectric body 11 located on the third electrode 13-3 of the negative side contracts axially. As a result, the piezoelectric body 11 is deflected and the end surfaces thereof shifts rearward while tilting, resulting in the state indicated by the broken line G.

Subsequently, when a negative voltage is applied to the first electrode 13-1 and a positive voltage is applied to the third electrode 13-3, the piezoelectric body 11 located on the first electrode 13-1 of the negative side contracts axially, and the piezoelectric body 11 located on the third electrode 13-3 of the positive side expands axially. As a result, the piezoelectric body 11 is deflected and shifted forward while tilting so as to show the end surfaces thereof, resulting in the state indicated by the broken line H.

In the alternating voltage, a positive potential and a negative potential are outputted repetitively with the elapse of time. Therefore, when the alternating voltage is applied to the first electrode 13-1 and the third electrode 13-3 so as to have the opposite polarity to each other, vibration of the secondary bending mode, which give rise to displacements in a back-and-forth direction (the direction indicated by the double-headed arrow I) in the drawing with respect to the axial line, is generated in the piezoelectric body 11.

Then, when these two vibrations of the secondary bending mode are combined, and the temporal phases of both vibrations are shifted 90 degrees ($\pi/2$) (namely, the temporal phase of the alternating voltage applied to the first electrode 13-1 and the third electrode 13-3 and the temporal phase of the alternating voltage applied to the second electrode 13-2 and the fourth electrode 13-4 are shifted 90 degrees), vibrations in the form of circular motion (in the direction indicated by the arrows K) around a central axis J of the piezoelectric body 11 occurs on the upper and lower end surfaces of the piezoelectric body 11, and these end surfaces of the piezoelectric body 11 undergo a wobbling motion, as shown in FIG. 4C.

FIGS. 5A and 5B are diagrams explaining the elliptic motion of point A on the end surfaces of the piezoelectric body 11. Specifically, FIG. 5A shows point A and point B on the end surface of the piezoelectric body 11. FIG. 5B shows the displacements of the point A and the point B. Here, the left and right direction corresponds to the x-axis direction on the drawing, the vertical direction corresponds to the y-axis direction on the drawing, and the back-and-forth direction corresponds to the z-axis direction on the drawing.

As shown in FIG. 5A, the point A is an upper point at the center of the first electrode 13-1, and the point B is an upper point at the center of the second electrode 13-2. The point A and the point B are located at positions having a 90-degree shift with respect to the circumferential center of the piezoelectric body 11.

Then, when drive signals having a 90-degree temporal phase shift (namely, the temporal phase difference is 90 degrees) are applied to the first electrode 13-1 and the second electrode 13-2, the point A and the point B start to oscillate.

As shown in FIG. 5B, at the time of phase t=0, the displacement of the point A becomes the maximum toward the upper side (in the up direction along the y-axis). On the other hand, the displacement of the point B is zero. Accordingly, the point A is displaced only upward (in the up direction along the y-axis). Although the point A is also displaced in the back-and-forth direction (the z-axis direction), the corresponding description is omitted here.

At the time $t=(1/2)\pi$, the displacement of the point A in the vertical direction (the y-axis direction) is zero. On the other hand, the displacement of the point B is maximized toward the upper side (in the up direction along the y-axis). At this time, the piezoelectric body 11 is curved (refer to FIG. 3), and therefore the point B is also shifted slightly leftward (in the left direction along the x-axis). The point A is correspondingly shifted slightly leftward (in the left direction along the x-axis).

At the time $t=(2/2)\pi$, the displacement of the point A toward the lower side (in the down direction along the y-axis) is maximized. On the other hand, the displacement of the point B is zero. Accordingly, the point A is displaced only downwards (in the down direction along the y-axis).

At the time $t=(3/2)\pi$, the displacement of the point A is shifted slightly rightward (in the right direction along the x-axis), based on the same principle as the time of $t=(1/2)\pi$.

By repeating the sequence of flow, the point A on the end surface of the piezoelectric body 11 undergoes elliptic motion in the direction indicated by the arrow L. Like the point A, individual points other than the point A on the end surface of the piezoelectric body 11 undergo elliptic motion. The moving element (not shown) press-contacting the piezoelectric body 11 is rotatably driven by the continuous elliptic motion generated on the end surface of the piezoelectric body 11.

Figure 6:
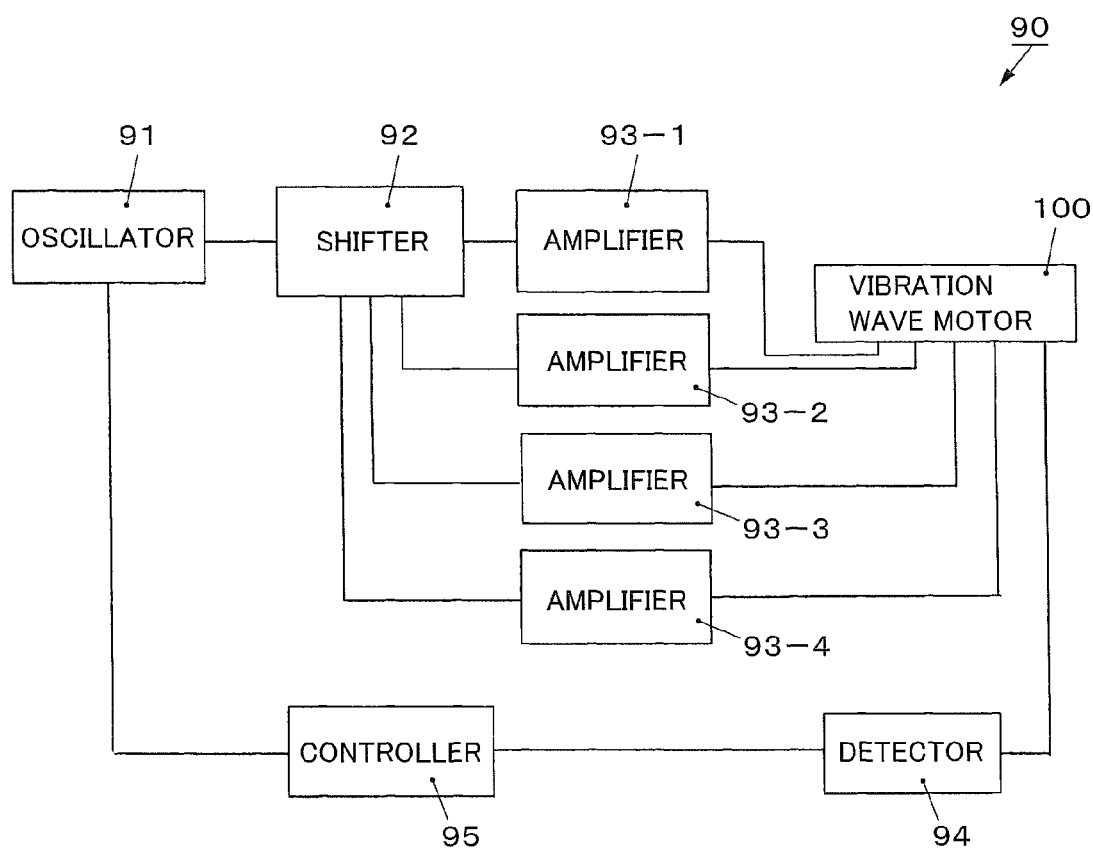
FIG. 6 is a block diagram explaining a drive controller of the vibrating wave motor 100.
Figure 7:
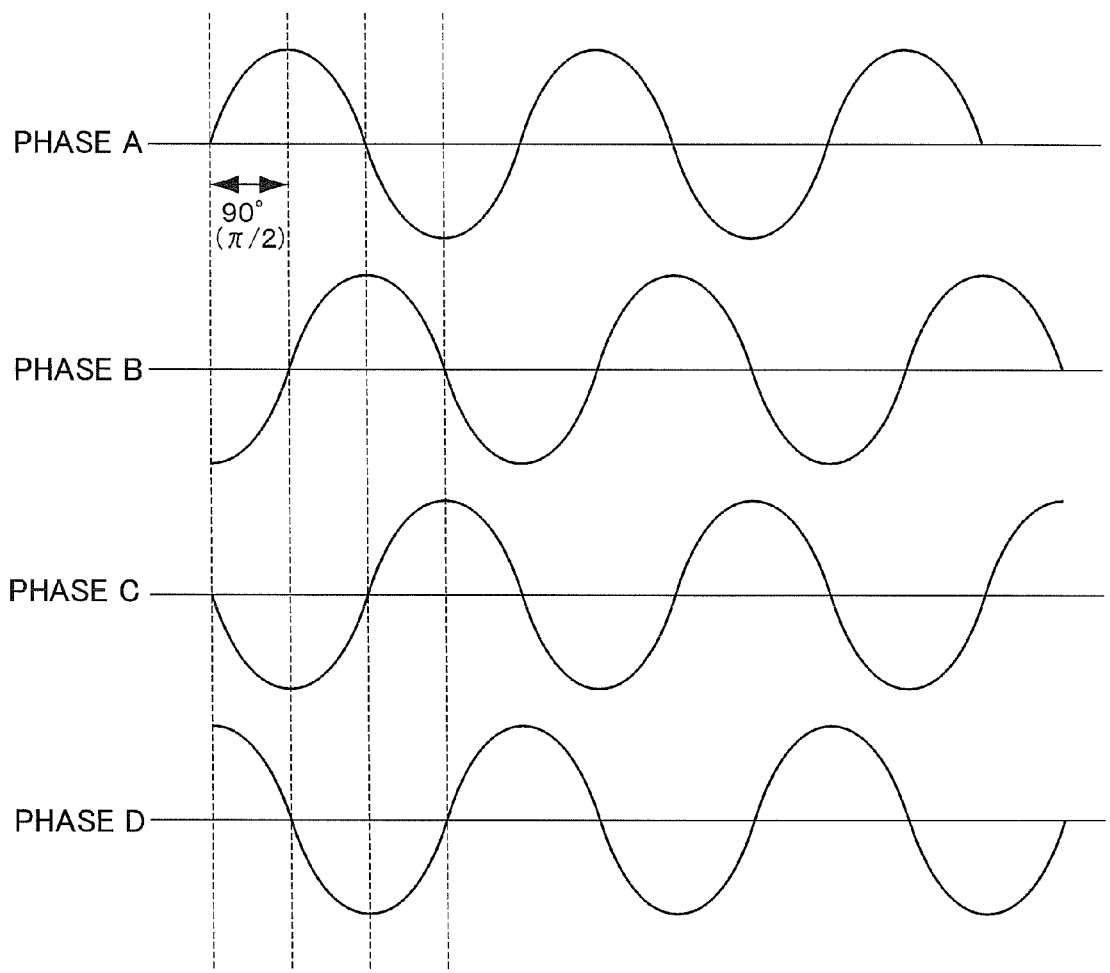
FIG. 7 is a diagram explaining four drive signals.

FIG. 6 is a block diagram explaining the drive controller of the vibration wave motor 100. FIG. 7 is a diagram explaining four drive signals.

The drive controller 90 of the vibration wave motor 100 is provided with an input circuit to input drive signals to the outer peripheral electrode patterns 13 (refer to FIG. 2). The drive controller 90 is provided with an oscillator 91, a phase shifter 92, amplifiers 93 (93-1 to 93-4), a detector 94 and a controller 95.

The oscillator 91 generates a drive signal having a desired frequency in accordance with the instructions from the controller 95.

The phase shifter 92 divides the drive signal generated at the oscillator 91 into four different drive signals having a 90-degree phase shift with respect to one another.

These four drive signals are divided into phase A, phase B, phase C and phase D, as shown in FIG. 7. These phases A, B, C and D have a 90-degree temporal phase shifts and have the following relationship. That is, the phase C is the opposite phase of the phase A, and the phase D is the opposite phase of the B phase. Specifically, there is a 90-degree phase shift between the phases A and B, a 180-degree phase shift between the phases A and C, and a 270-degree phase shift between the phases A and D.

As shown in FIG. 6, the amplifiers 93 (93-1 to 93-4) raise these four drive signals divided by the phase shifter 92 to their respective desired voltages. These four drive signals outputted from these amplifiers 93-1 to 93-4 are inputted to the first electrode 13-1, the second electrode 13-2, the third electrode 13-3 and the fourth electrode 13-4 of the outer peripheral electrode pattern 13, respectively. These drive signals are then transmitted through their respective electrodes to the piezoelectric body 11.

The detector 94 is constructed from an optical encoder, a magnetic encoder or the like, and detects the positions and speeds of driven bodies driven by the vibration wave motor 100 (the moving element 20, the output gear 30, or members to be driven along with drives therefore).

The controller 95 controls the drive of the vibration wave motor 100 in accordance with a drive instruction from the CPU of a device on which the vibration wave motor 100 is mounted. The controller 95 controls the frequency of the oscillator 91 so as to be positioned at a desired position by receiving a detection signal from the detector 94 and obtaining position information and speed information based on the value of the detect signal.

Subsequently, the drive controller 90 operates as follows.

Firstly, the desired position is transmitted to the controller 95. A drive signal is generated from the oscillator 91, and the signal is divided into four drive signals having a 90-degree phase shift from one another by the phase shifter 92, and then amplified to a desired voltage by the amplifier 93.

These drive signals having a 90-degree phase shift with respect to one another are then each inputted to the outer peripheral electrode patterns. At this time, the drive signals having a 90-degree phase shift with respect to each other are inputted to the outer peripheral patterns adjacent each other. Specifically, the drive signal of the phase A is applied to the first electrode 13-1, the drive signal of the phase B is applied to the second electrode 13-2, the drive signal of the phase C is applied to the third electrode 13-3, and the drive signal of the phase D is applied to the fourth electrode 13-4.

Upon the application of the drive signals of the phase A and the phase C to the piezoelectric body 11, a first standing wave is generated in the piezoelectric body 11. Upon the application of the drive signals of the phase B and the phase D to the piezoelectric body 11, a second standing wave is generated in the piezoelectric body 11. The first and second standing waves combine to excite vibrations in the form of circular motion, so that the end surface of the piezoelectric body 11 is subjected to wobbling motion.

The slide plate 12 is mounted on the end surface of the piezoelectric body 11, and the moving element 20 press-contacting the slide plate 12 is frictionally rotatably driven by the wobbling motion.

The detector 94 is mounted on a driven body to be driven by the drive of the vibration wave motor 100. An electrical pulse signal is generated from the detector 94 and transmitted to the controller 95. Based on the signal, the controller 95 can obtain the present location and the speed, and controls the drive frequency of the oscillator 91 in accordance with these position information, speed information and desired position information.

Thus, the vibrating element 10 and the vibration wave motor 100 of the first embodiment produce the following effects.

(1) The displacement of the piezoelectric body 11 is proportional to an electric field (voltage (V)/thickness (m)). In the first embodiment, the piezoelectric body 11 has a thin-wall cylindrical shape, and therefore the thickness value becomes extremely small. Even if the voltage is lowered, a strong electric field is obtainable, achieving a large displacement. This provides a vibrating element 10 and vibration wave motor 100 which can drive at a low voltage and have output performance which is not impaired by low-voltage drive.

(2) The electrostatic capacity of the piezoelectric body 11 becomes larger with decreasing thickness, and becomes larger by increasing the electrode area. In the first embodiment, the piezoelectric body 11 has a thin-wall cylindrical shape, and the individual electrodes are arranged on substantially the entire surface of the outer peripheral surface and the inner peripheral surface of the piezoelectric body 11, thus enabling an increase in the electrostatic capacity of the piezoelectric body 11. Even when driven at a low voltage, a strong electric field is obtainable, ensuring a large output.

(3) The piezoelectric body 11 is polarized only in one polarization direction. This reduces the number of manufacturing steps and causes less deformation after polarization, enabling the piezoelectric body 11 with a high dimensional accuracy to be manufactured at low cost.

(4) In the first embodiment, the first electrode 13-1 and the third electrode 13-3, and the second electrode 13-2 and the fourth electrode 13-4 are arranged opposite each other, and these two opposite electrodes cooperate to excite vibrations. Therefore, a large vibration amplitude can be obtained efficiently, achieving a low-voltage drive.

Figure 8:
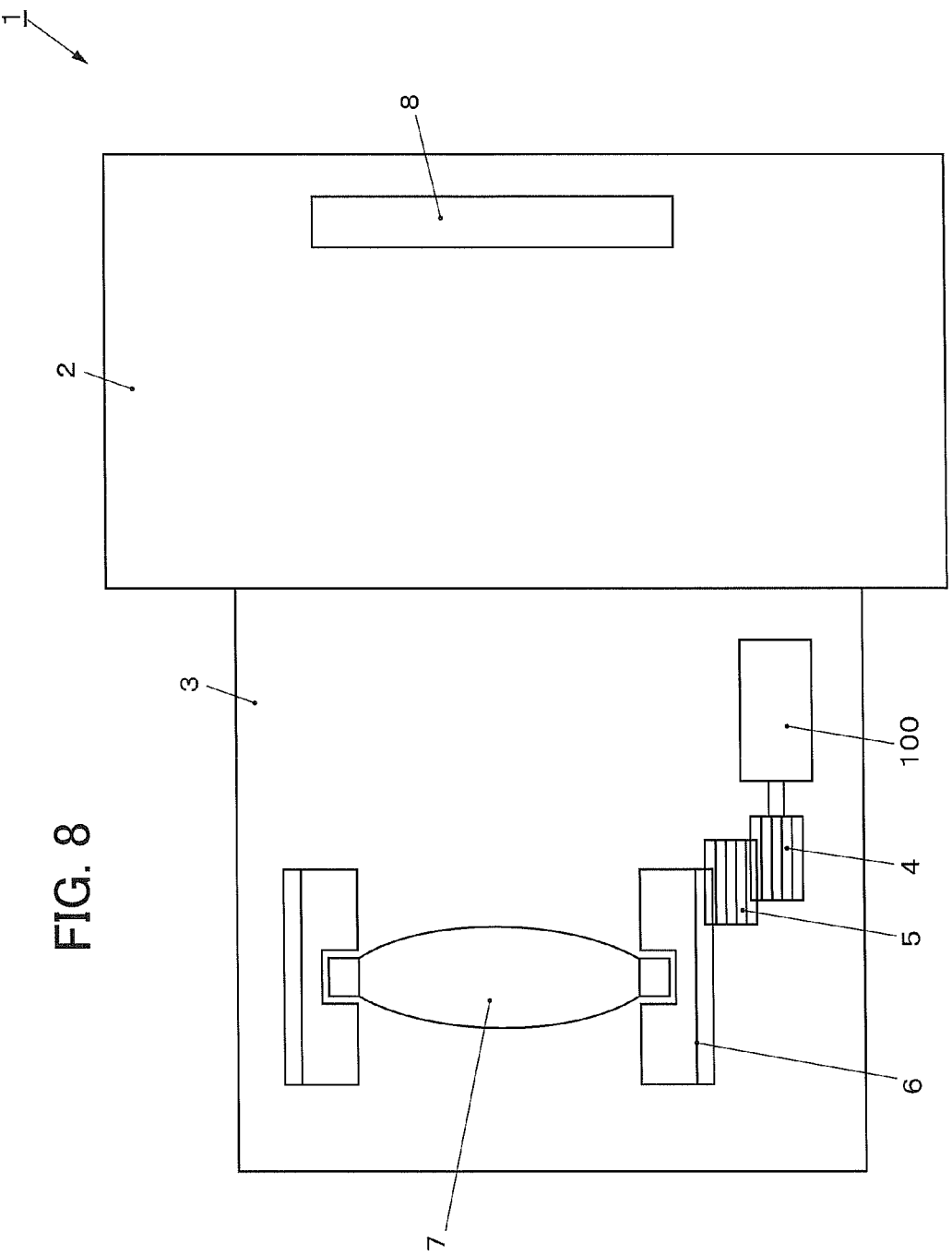
FIG. 8 is a diagram showing a camera system of the first embodiment.

FIG. 8 is a diagram showing a camera system of the first embodiment.

A camera system 1 of the first embodiment is provided with a camera body 2 having an image pickup element 8, and a lens barrel 3 having a lens 7. The lens barrel 3 is an interchangeable lens detachable from the camera body 2. Although the first embodiment employs the interchangeable lens as the lens barrel 3, without being limited thereto, for example, a lens barrel integral with the camera body may be employed.

The lens barrel 3 includes the lens 7, a cam barrel 6, gears 4 and 5, and the vibration wave motor 100. In the embodiment, the vibration wave motor 100 is used as a drive source to drive the lens 7 when the camera system 1 performs a focus operation. The driving force obtained from the vibration wave motor 100 is transmitted through the gears 4 and 5 to the cam barrel 6. The lens 7 is a focus lens to perform focal adjustment, which is held in the cam barrel 6 and shifted in an optical axis direction by the driving force of the vibration wave motor 100.

In the above configuration, a subject image is formed on the image pickup surface of the image pickup element 8 by the optical system (the image pickup optical system) of the lens barrel 3. At this time, by driving the vibration wave motor 100, the lens 7 is driven to perform the auto focus operation. Subsequently, the image pickup element 8 converts the subject image formed on the image pickup surface into electric signals, and these signals are processed to generate image data by an image processing section.

Thus, the camera system 1 of the embodiment is provided with an vibration wave motor 100 capable of driving at a low voltage, eliminating the need to mount a high-ratio voltage raising device. This realizes a camera system with no electric power loss due to the raised voltage and consuming less electric power.

Second Embodiment

Figure 9:
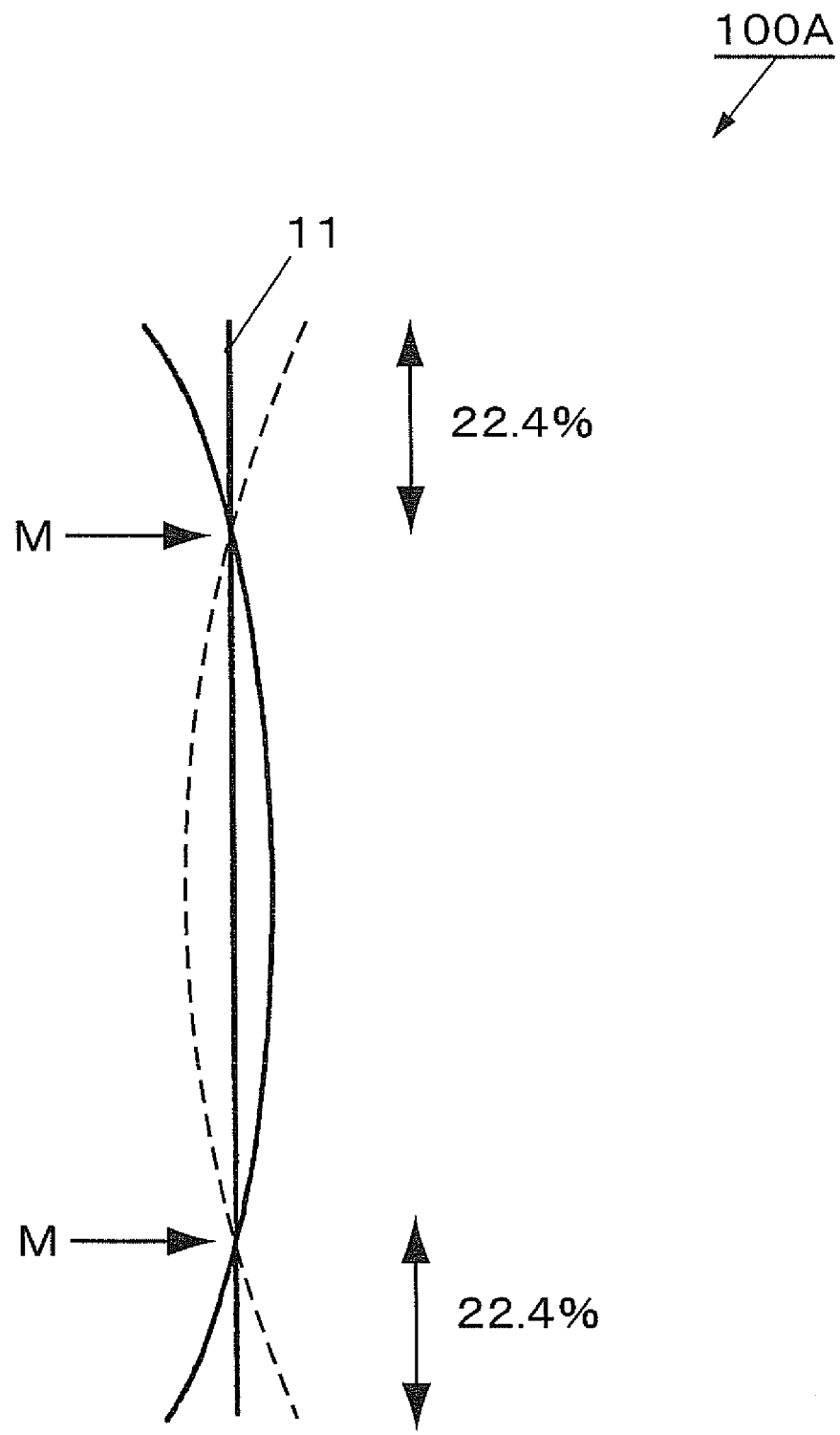
FIG. 9 is a schematic diagram showing a vibrating wave motor according to a second embodiment.

FIG. 9 is a schematic diagram showing an vibration wave motor of a second embodiment.

For components having the same functions as those in the foregoing first embodiment, overlapping descriptions are omitted here.

As stated earlier in the description with reference to FIG. 1, the vibrating element support member 70 is connected to the part of the inner surface of the piezoelectric body 11. In the second embodiment, the connecting positions (namely, support positions) are defined.

In an vibration wave motor 100A of the second embodiment, with respect to an axial length (the length from one end surface to the other end surface), support positions M of the piezoelectric body 11 are located at positions corresponding to 22.4% of the axial length from the end surfaces, respectively. In FIG. 9, with respect to the piezoelectric body 11 (indicating the inner surface position of the piezoelectric body 11), the support positions M of the vibrating element support member 70 are located at the position corresponding to 22.4% of the axial length, from the upper end surface and at the position corresponding to 22.4% of the axial length from the lower end surface.

These support positions M correspond to the position where the vibrating displacement of the secondary bending mode as the vibration mode of the piezoelectric body 11 becomes zero (namely, the positions of nodes of vibrations generated in the piezoelectric body 11). Although the optimal support positions have the value of 22.4% from both end surfaces with respect to the axial length, no practical problem will occur in the range of 15 to 30%.

Although the second embodiment is constructed to support the inner surface side of the piezoelectric body 11, it may be constructed to support the outer surface side.

Consequently, in the vibration wave motor 100A of the second embodiment, the piezoelectric body 11 is supported at the position where the oscillating displacement becomes zero. This minimizes the vibration damping due to the support, and reduces the support loss.

(Modifications)

The following modifications are applicable to the foregoing embodiments.

(1) The outer peripheral electrode pattern 13 may be divided into three or five or more instead of four.

(2) The case where the outer peripheral electrode pattern 13 is divided and the inner peripheral electrode pattern 14 is not divided has been described above. On the contrary, the outer peripheral electrode pattern 13 may not be divided and the inner peripheral electrode pattern 14 may be divided. In this case, the inner peripheral electrode pattern 14 is driven by applying a voltage.

(3) The piezoelectric body 11 may be arranged in the inner and outer peripheries of the elastic body to obtain the vibrating element.

(4) The piezoelectric body 11 may be a polygonally shaped tubular member instead of the cylindrically shaped one.

(5) The piezoelectric body 11 may be polarized in the direction from the outside to the inside of the thickness portion of the peripheral edge in the piezoelectric body 11, instead of the direction from the inside to the outside.

(6) Although the foregoing embodiments have been described taking as an example the drive source of autofocus in the camera system, they are applicable to the drive source of a blur-correcting mechanism that corrects hand blurring by driving part of the image pickup system of the camera system, drive sections of copying machines, tilting devices for steering wheels of automobiles, driving devices of watches and clocks, and the like.

In addition, the above-mentioned embodiments and modifications may be combined suitably. The detailed description thereof is omitted here. It is to be understood that the foregoing embodiments are not intended to be limiting of the invention.

The invention claimed is:

1. A vibrating device comprising:
an elastically deformable tube-like unit having a hollow section; and
an input unit comprising a first part and a second part configured to input a physical signal to the tube-like unit, the first part being attached to an outer surface of the tube-like unit and the second part being attached to an inner surface thereof on a side of the hollow section and at least one of the first part and the second part being divided into N portions, where N is an integer of 3 or more, in a circumferential direction of the tube-like unit.

2. The vibrating device according to claim 1, wherein
the tube-like unit comprises one of an electromechanical conversion element and a member provided with an electromechanical conversion element.

3. The vibrating device according to claim 2, wherein
the electromechanical conversion element is polarized in one of a direction from inside to outside the tube-like unit and a direction from outside to inside the tube-like unit.

4. The vibrating device according to claim 1, wherein
the tube-like unit comprises a cylindrical shape.

5. The vibrating device according to claim 1, wherein
the divided N portions of the input unit comprise input electrodes.

6. The vibrating device according to claim 1, wherein
a pair of divided N portions of the input unit is arranged opposite to each other around a center of the tube-like unit.

7. A vibration actuator comprising:
an elastically deformable tube-like unit having a hollow section;
an input unit comprising a first part and a second part configured to input a physical signal to the tube-like unit, the first part being attached to an outer surface of the tube-like unit and the second part being attached to an inner surface thereof on a side of the hollow section and at least one of the first part and the second part being divided into N portions, where N is an integer of 3 or more, in a circumferential direction of the tube-like unit; and
a movable unit configured to be in contact with an end surface of the elastically deformable tube-like unit such that vibration of the elastically deformable tube-like unit causes the movable unit to move on the end surface.

8. The vibration actuator according to claim 7, further comprising:
an input circuit configured to input signals to the divided N portions, the signals having a phase shift of 360 degrees divided by N with respect to one another.

9. The vibration actuator according to claim 8, wherein
the input circuit inputs the signals to adjacent pairs of the divided N portions.

10. The vibration actuator according to claim 7, wherein
an end surface of the elastically deformable tube-like unit in contact with the movable unit undergoes wobbling motion.

11. The vibration actuator according to claim 7, wherein
a vibration mode of the elastically deformable tube-like unit comprises a secondary bending mode.

12. The vibration actuator according to claim 7, further comprising:
a support unit configured to support the elastically deformable tube-like unit at nodes of vibration generated in the elastically deformable tube-like unit.

13. The vibration actuator according to claim 7, further comprising:
a slide unit configured to be interposed between the elastically deformable tube-like unit and the movable unit.

14. The vibration actuator according to claim 7, wherein
the vibration actuator is employed in a lens barrel.

15. The vibration actuator according to claim 7, wherein
the vibration actuator is employed in a camera system.

16. A method for driving a vibration actuator, the vibration actuator comprising:
an elastically deformable tube-like unit having a hollow section; and
an input unit comprising a first part and a second part configured to input signals to the tube-like unit, the first part being attached to an outer surface of the tube-like unit and the second part being attached to an inner surface thereof on a side of the hollow section and at least one of the first part and the second part being divided into N portions, where N is an integer of 3 or more, in a circumferential direction of the tube-like unit; and
a movable unit configured to be in contact with an end surface of the tube-like unit,
the method comprising:
inputting the signals to the divided N portions, the signals having a phase shift of 360 degrees divided by N with respect to one another,
causing the end surface of the tube-like unit to undergo wobbling motion; and
causing the movable unit to move.

17. The method according to claim 16, wherein
the inputting the signals is performed for adjacent pairs of the divided N portions.

18. A vibrating device comprising:
a tubular electromechanical conversion unit configured to be elastically deformable and have a hollow section;
an outer peripheral electrode pattern configured to be attached to an outer surface of the tubular electromechanical conversion unit to input a signal to the tubular electromechanical conversion unit; and
an inner peripheral electrode pattern configured to be attached to an inner surface of the tubular electromechanical conversion unit to input the signal to the tubular electromechanical conversion unit together with the outer peripheral electrode pattern,
wherein at least one of the outer peripheral electrode pattern and the inner peripheral electrode pattern is divided into N portions, where N is an integer of 3 or more, in a circumferential direction of the tubular electromechanical conversion unit.

19. The vibrating device according to claim 18, further comprising:
   an input circuit configured to input signals to the divided N portions, the signals having a phase shift of 360 degrees divided by N with respect to one another.

20. The vibrating device according to claim 19, wherein the input circuit inputs the signals to adjacent pairs of the divided N portions.

* * * * *